(12) United States Patent
Lin et al.

(10) Patent No.: US 11,755,804 B2
(45) Date of Patent: Sep. 12, 2023

(54) HYBRID SYNCHRONOUS AND ASYNCHRONOUS CONTROL FOR SCAN-BASED TESTING

(71) Applicant: Xilinx, Inc., San Jose, CA (US)

(72) Inventors: Albert Shih-Huai Lin, Mountain View, CA (US); Rambabu Nerukonda, Sunnyvale, CA (US); Niravkumar Patel, San Jose, CA (US); Amitava Majumdar, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 57 days.

(21) Appl. No.: 17/646,184

(22) Filed: Dec. 28, 2021

(65) Prior Publication Data

US 2023/0205959 A1    Jun. 29, 2023

(51) Int. Cl.

| | | |
|---|---|---|
| *G06F 30/333* | (2020.01) | |
| *G06F 30/367* | (2020.01) | |
| *G06F 30/396* | (2020.01) | |
| *G06F 30/398* | (2020.01) | |
| *G06F 30/20* | (2020.01) | |
| *G06F 11/267* | (2006.01) | |
| *G06F 11/27* | (2006.01) | |
| *H01L 25/00* | (2006.01) | |
| *H03K 19/17732* | (2020.01) | |
| *H03K 19/17764* | (2020.01) | |
| *G06F 115/08* | (2020.01) | |
| *H01L 21/66* | (2006.01) | |

(52) U.S. Cl.
CPC ..... *G06F 30/333* (2020.01); *H03K 19/17732* (2013.01); *H03K 19/17764* (2013.01); *G06F 11/267* (2013.01); *G06F 11/27* (2013.01); *G06F 30/20* (2020.01); *G06F 30/367* (2020.01); *G06F 30/396* (2020.01); *G06F 30/398* (2020.01); *G06F 2115/08* (2020.01); *H01L 22/34* (2013.01); *H01L 25/00* (2013.01)

(58) Field of Classification Search
CPC .... G06F 30/333; G06F 30/367; G06F 30/396; G06F 30/398; G06F 30/20; G06F 2115/08; G06F 11/267; G06F 11/27; H01L 22/34; H01L 25/00; H03K 19/17732; H03K 19/17764
USPC ............ 716/106, 111, 136; 703/16; 714/726, 714/733, 741; 326/38, 41, 47, 101
See application file for complete search history.

(56) References Cited

U.S. PATENT DOCUMENTS

| | | |
|---|---|---|
| 4,855,669 A | 8/1989 | Mahoney |
| 5,047,710 A | 9/1991 | Mahoney |
| 5,550,843 A | 8/1996 | Yee |
| 5,673,273 A | 9/1997 | Almy |
| 5,675,589 A | 10/1997 | Yee |
| 5,909,453 A | 6/1999 | Kelem et al. |
| 6,070,260 A | 5/2000 | Buch et al. |

(Continued)

*Primary Examiner* — Phallaka Kik
(74) *Attorney, Agent, or Firm* — Kevin T. Cuenot (57) ABSTRACT

An integrated circuit includes an intellectual property core, scan data pipeline circuitry configured to convey scan data to the intellectual property core, and scan control pipeline circuitry configured to convey one or more scan control signals to the intellectual property core. The integrated circuit also includes a wave shaping circuit configured to detect a trigger event on the one or more scan control signals and, in response to detecting the trigger event, suppress a scan clock to the intellectual property core for a selected number of clock cycles.

20 Claims, 5 Drawing Sheets

(56) References Cited

U.S. PATENT DOCUMENTS

| | | |
|---|---|---|
| 6,226,779 B1 | 5/2001 | Baxter et al. |
| 6,314,539 B1 | 11/2001 | Jacobson et al. |
| 6,389,558 B1 | 5/2002 | Herrmann et al. |
| 6,499,124 B1 | 12/2002 | Jacobson |
| 6,813,739 B1 * | 11/2004 | Grannis, III ... G01R 31/318572 714/E11.16 |
| 6,944,836 B1 | 9/2005 | Lai |
| 7,080,300 B1 | 7/2006 | Herron et al. |
| 7,102,555 B2 | 9/2006 | Collins et al. |
| 7,188,043 B1 | 3/2007 | Wolf |
| 7,739,564 B1 | 6/2010 | Lai et al. |
| 8,063,654 B2 | 11/2011 | Rahman et al. |
| 8,072,234 B2 | 12/2011 | Fox |
| 8,327,201 B1 | 12/2012 | Lai |
| 9,685,957 B2 | 6/2017 | How |
| 10,067,189 B1 | 9/2018 | Shivaray et al. |
| 10,169,177 B1 * | 1/2019 | Shivaray .............. H03K 19/003 |
| 10,317,464 B2 | 6/2019 | Chaudhuri |
| 10,816,598 B1 | 10/2020 | Merugu et al. |
| 2002/0078412 A1 | 6/2002 | Wang et al. |
| 2003/0023941 A1 * | 1/2003 | Wang .................... G06F 30/327 716/103 |
| 2004/0268181 A1 * | 12/2004 | Wang ............. G01R 31/318594 714/E11.169 |
| 2005/0154552 A1 | 7/2005 | Stroud et al. |
| 2005/0172254 A1 * | 8/2005 | Watanabe ...... G01R 31/318555 716/102 |
| 2005/0283693 A1 * | 12/2005 | Dixon ................. G06F 11/2236 714/E11.019 |
| 2008/0022172 A1 * | 1/2008 | Yi ....................... G06F 11/2236 714/726 |
| 2009/0212818 A1 * | 8/2009 | Sakai .................... G06F 30/327 326/46 |
| 2010/0211839 A1 * | 8/2010 | Almukhaizim ....... G06F 11/267 714/E11.155 |
| 2012/0126846 A1 | 5/2012 | Jong et al. |
| 2017/0315659 A1 * | 11/2017 | Kuroiwa .............. G09G 3/3648 |
| 2018/0095863 A1 * | 4/2018 | Woo ........................ G06F 21/74 |
| 2018/0238965 A1 * | 8/2018 | Anzou .................. G11C 11/418 |
| 2020/0168172 A1 * | 5/2020 | Sawahata ............. G09G 3/3611 |
| 2020/0233030 A1 * | 7/2020 | Flores ............. G01R 31/31703 |
| 2023/0110161 A1 * | 4/2023 | Nadeau-Dostie ......... G06F 1/12 713/401 |

\* cited by examiner

HYBRID SYNCHRONOUS AND ASYNCHRONOUS CONTROL FOR SCAN-BASED TESTING

TECHNICAL FIELD

This disclosure relates to integrated circuits (ICs) and, more particularly, to IC design for testability.

BACKGROUND

Design for testability (DFT) refers to design techniques that add testability features to hardware products such as integrated circuits (ICs). When included in an IC, testability features allow certain aspects of the IC to be tested. The testability features facilitate the detection of manufacturing defects in the IC that may adversely impact the IC's ability to function correctly. Scan test is an example of a DFT feature included in modern ICs where flip-flops within an IC may be configured into one or more shift registers, referred to as scan chains, that are accessible from external pins of the IC. The scan chains are capable of propagating signals for testing purposes. This makes flip-flops within the IC controllable and observable from the external pins of the IC and effectively converts complex sequential circuit designs into combinatorial logic facilitating use of automated test pattern generation (ATPG). Test data (e.g., test signals) may be fed into the IC and propagate through the scan chains allowing the circuitry to be tested by observing signals output from pins of the IC. The ever-increasing size and complexity of ICs presents new challenges for DFT.

SUMMARY

In one or more example implementations, an integrated circuit (IC) includes an intellectual property core, scan data pipeline circuitry configured to convey scan data to the intellectual property core, and scan control pipeline circuitry configured to convey one or more scan control signals to the intellectual property core. The IC includes a wave shaping circuit configured to detect a trigger event on the one or more scan control signals and, in response to detecting the trigger event, suppress a scan clock as provided to the intellectual property core for a selected number of clock cycles.

In one or more example implementations, an IC includes an intellectual property core and a wave shaping circuit adapted for scan testing the intellectual property core. The wave shaping circuit includes one or more wave shaping sub-circuits. Each wave shaping sub-circuit is operative to suppress a scan clock as provided to the intellectual property core in response to detecting a trigger event on an associated scan control signal. Each wave shaping sub-circuit is independently programmable to suppress the scan clock for a selected number of clock cycles specific to the respective wave shaping sub-circuit.

In one or more example implementations, a method includes providing scan data to each of a plurality of instances of an intellectual property core within an integrated circuit through scan data pipeline circuitry. The method includes providing one or more scan control signals to each of the plurality of instances through scan control signal pipeline circuitry. The scan data pipeline circuitry and the scan control signal pipeline circuitry to each respective one of the plurality of instances are matched. The method includes, for each instance of the plurality of instances, selectively suppressing a scan clock to the instance for a number of clock cycles using a wave shaping circuit associated with the instance. For each instance the selectively suppressing is based on detecting a trigger event on the one or more scan control signals provided to the instance.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to IC design for testability (DFT). One example of a DFT feature is scan test. Scan test is a technology that facilitates detection of manufacturing defects in ICs. Scan test typically accounts for a majority of the testing cost for an IC and a significant portion of the overall production cost of the IC. With the increasing complexity of ICs and the increasing number of hardened circuits included in such ICs, the cost and complexity of scan test also has risen.

A scan test for a hardened intellectual property Core (IP core) on an IC involves a variety of operations. A scan enable signal to the IP core is asserted. With the scan enable signal asserted, test stimuli may be shifted into the IP core. The scan enable signal is de-asserted so that the response of the IP core to the test stimulus may be captured. Scan control signals, including scan-enable, may then be asserted so that the response of the IP core may be shifted out while new stimuli are shifted into the IP core. The process may be repeated according to the number of scan test patterns existing for the IP core. A scan test pattern refers to a test stimuli and test response pair for a given circuit block such as an IP core.

Traditionally, most scan test time was spent shifting in test stimuli and shifting out test responses. Test time was generally estimated according to the expression N×L×P, where N is the number of test patterns, L is the length of the shift-registers or scan chains, and P is the scan clock signal (scan clock) period (e.g., 1/F where F is the scan clock frequency). While the order of P has remained largely unchanged, technological improvements have significantly reduced N and L. Within modern ICs, test time is more accurately estimated by the expression $N \times (L_{in}+L_{out}+S) \times P$, where $L_{in}$ is the length of scan chains inside the IP core, $L_{out}$ is the number of pipeline stages added outside of the IP cores to support scan clock frequencies used for timing scan chains inside the IP cores, and S is the time to assert and de-assert scan control signals. In general, $L_{out}$ is determined by the size of the IC and P.

Scan control signals are traditionally asynchronous to provide testers with explicit control over scan-based testing to ensure correct performance of the scan test. Since N, P, $L_{in}$, and $L_{out}$ are determined by external factors such as IC size and route-lengths, it may be appreciated that reduction in testing time may be achieved by reducing the switching time of the scan control signals. Within large ICs and, in particular, System-on-Chip type of ICs that may include multiple dies and/or chiplets, scan control signals are usually conveyed over very long wires. These wires may span multiple dies and/or chiplets.

The switching times of scan control signals match scan shift times. Inside of the IP core, the scan control signals switch much faster typically on the order of 2 shift cycles. Outside of the IP core, e.g., from the Automatic Test Equipment (ATE) or "tester" accessible pins of the IC to the IP cores, the wires are very long and require close to 50 shift cycles. This is approximately ¼ of $L_{in}$. Thus $S=S_{in}+S_{out}$, where $S_{out}$ dominates. The inventive arrangements are capable of reducing $S_{out}$ to zero or close to zero. Accordingly, $L_{out}+S \cong 0$. This may translate into a reduction in scan test time and are reduction in cost for ICs in the range of approximately 20% to 50%.

In one or more examples, an IC may include one or more IP cores. The IP cores are hardened. The IC can include scan data pipeline circuitry configured to convey scan data to each of the IP cores and scan control pipeline circuitry configured to convey one or more scan control signals to each of the IP cores. Each of the IP cores may include a wave shaping circuit. The wave shaping circuit is configured to detect a trigger event on the one or more scan control signals and, in response to detecting the trigger event, suppress a scan clock signal (scan clock) provided to the respective IP core including the wave shaping circuit for a selected number of clock cycles. The one or more IP cores may be a plurality of instances of a particular or same IP core.

In one or more other examples, the wave shaping circuit is adapted for scan-based testing of the IP core. The wave shaping circuit may include one or more wave shaping sub-circuits. Each wave shaping sub-circuit may be operative to suppress an associated scan control signal in response to detecting a trigger event on the associated scan control signal. Each wave shaping sub-circuit may be independently programmable to suppress the scan clock provided to the instance of the IP core for a selected number of clock cycles specific to the respective wave shaping sub-circuit.

The inclusion of scan data pipeline circuitry and scan control pipeline circuitry external to the IP cores reduces the difference in arrival time between the scan data and the scan control signals at the boundary of the IP cores. Scan data and scan control signals are synchronous within the IC in regions external to the instances of the IP core(s) being tested. The wave shaping circuits facilitate asynchronous control over the scan control signals inside of the IP cores. In consequence, the IP cores require less hardware overhead, e.g., less internal pipelining, as described herein below. Further aspects of the inventive arrangements are described below with reference to the figures.

Figure 1:
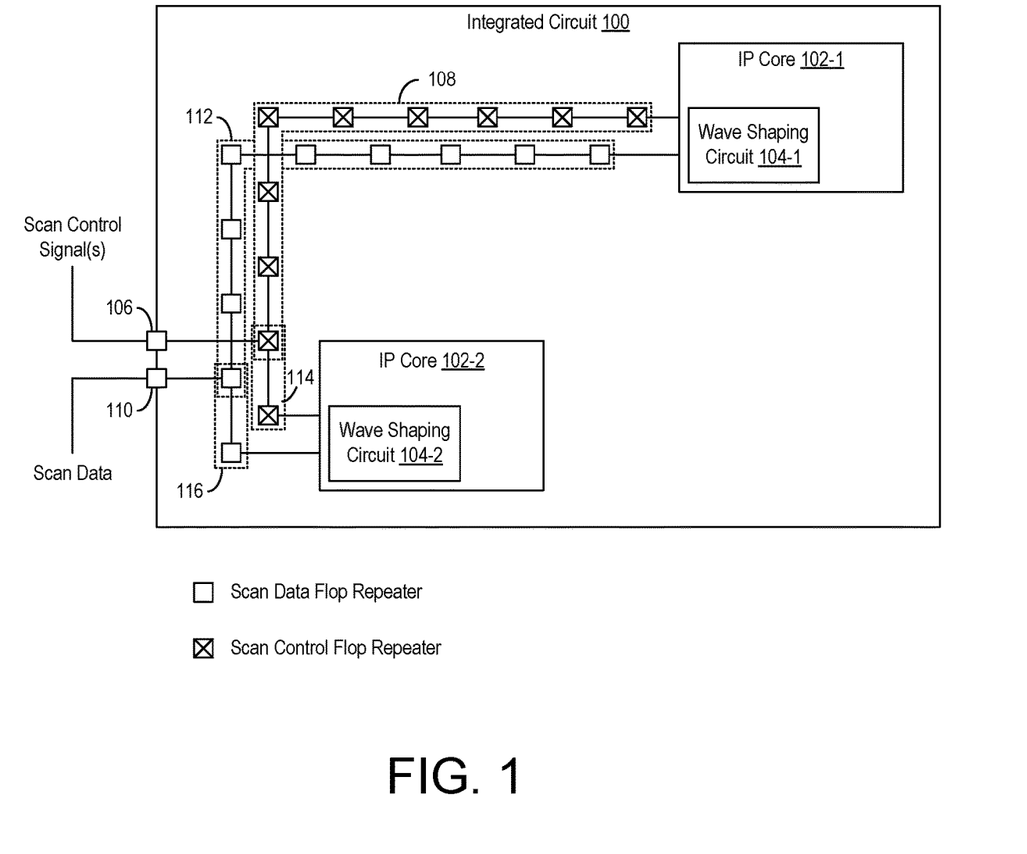
FIG. 1 illustrates an example of an integrated circuit (IC) including a scan test circuit architecture in accordance with the inventive arrangements described herein.

FIG. 1 illustrates an example of an IC 100. IC 100 may be implemented as any of a variety of different types of ICs that include one or more IP cores. The IP cores are hardened, e.g., hardwired, circuit blocks. IC 100 may include other types of circuit blocks including programmable circuitry. Programmable logic is an example of programmable circuitry. IC 100 may include one or more other types of subsystems as well. Examples of other subsystems that may be included in IC 100 may include one or more processors and/or processor subsystems, a processor array such as a data processing engine array, and/or a Network-on-Chip (NoC) that may be programmable. For example, IC 100 may be implemented as an Application Specific IC (ASIC), as a SoC, as a programmable IC, or the like.

In one or more example implementations, IC 100 may be implemented as a single die. In other example implementations, IC 100 may be formed of a plurality of dies, chips and/or chiplets, and/or hardened individual IP cores communicatively linked using one or more available interconnect technologies (e.g., flip-chip technology, interposer technology, or the like). The various dies, chips, chiplets, and/or hardened IP cores may be included within a single IC package.

For purposes of illustration, IC 100 includes multiple instances of a particular IP core 102. As defined herein, the term "intellectual property core" or "IP core" means a pre-designed and reusable unit of logic design, a cell, or portion of chip layout design in the field of electronic circuit design. An IP core may be expressed as a data structure specifying a description of circuitry that performs a particular function. An IP core may be expressed using hardware description language file(s), as a netlist, as a bitstream that programs a programmable IC, or the like. An IP core may be used as a building block within circuit designs adapted for implementation within an IC.

In the example of FIG. 1, IP core 102 is implemented as a hardened circuit block where IC 100 includes two different instances of IP core 102. Each instance of IP core 102 includes a wave shaping circuit 104. IP core 102-1 (e.g., the particular instance of IP core 102) is coupled to one or more external pins 106 of IC 100 through scan control pipeline circuitry 108 and to one or more external pins 110 of IC 100 through scan data pipeline circuitry 112. IP core 102-2 is coupled to external pin(s) 106 of IC 100 through scan control pipeline circuitry 114 and to external pin(s) 110 of IC 100 through scan data pipeline circuitry 116. In the example, scan control pipeline circuitry 108, 114 is formed of a plurality of scan control flip-flops, also referred to as scan control flop repeaters. Scan control circuitry 108, 114 conveys scan control signals to the respective instances of IP core 102. Scan data pipeline circuitry 112, 116 is formed of one or more scan data flip-flops, also referred to herein as scan data flop repeaters. In the example, each individual scan control signal of the scan control signals may be pipelined as shown. Scan data pipeline circuitry 112, 116 conveys scan data signals (scan data) to the respective instances of IP core 102.

It should be appreciated that ATE may be used to drive scan control signals and/or scan data into IC 100 via external pins 106 and 110. In this regard, external pins are examples of pins of IC 100 that are accessible by a tester.

The example of FIG. 1 illustrates that the scan control signals, like the scan data, are pipelined. Pipelining the scan control signals in the same manner as the scan data removes the need for pipeline equalization between instances of IP core 102. That is, pipeline circuitry for each instance of IP core 102 is matched in terms of latency (e.g., number of flip-flops) for the scan data and the scan control signals. Pipelining both the scan control signals and the scan data using latency matched circuitry ensures that, for each instance of IP core 102, there is no differential between the time that the scan data reaches the instance of IP core 102-1 and the time that the scan control signals reach the instance of IP core 102-2.

As illustrated, both scan data and scan control signals propagate to each instance of IP core 102 synchronously. The matched pipelining eliminates the need to include pipeline equalization circuitry within each respective instance of IP core 102. Pipeline equalization circuitry is typically implemented as a programmable delay circuit block for each of the scan control signals provided to each respective instance of IP core 102. This requires a significant amount of IC resources (e.g., components and/or area). Further, were synchronous distribution of scan test signals within the instances of the IP core 102 to be maintained, a large tree structure of flip-flops would be required for each scan control signal. Accordingly, within the instances of the IP core 102, asynchronous signal propagation is used. The wave shaping circuits 104 for each respective instance of IP core 102 implement the asynchronous distribution of scan control signals within the instances of IP block 102.

In the example of FIG. 1, the wave shaping circuits 104 are illustrated as being within the respective instances of IP core 102. Accordingly, in certain example implementations, the wave shaping circuits 104 may be implemented as hardened circuitry that is part of, or included in, the respective instances of the IP cores being tested. Similarly, scan control pipeline circuitry 108, 114 and scan data circuitry 112, 116 may be implemented as hardened circuitry.

In one or more examples, wave shaping circuits 104 may be implemented external to the particular instances of IP cores. For example, wave shaping circuit 104-1 may be implemented external to IP core 102-1. Though external to IP core 102-1, wave shaping circuit 104-1 is capable of monitoring scan control signals provided to IP core 102-1 at the boundary of IP core 102-1 and selectively suppressing the scan clock provided to IP core 102-1. Still, wave shaping circuit 104 may be implemented as hardened circuitry.

In one or more examples, in cases where the IC 100 includes programmable circuitry, one or more or each of wave shaping circuits 104, scan control pipeline circuitry 108, 114, and/or scan data circuitry 112, 116 (or any combination thereof) may be implemented using the programmable circuitry of IC 100. This allows an existing instance of an IP core to be effectively retrofitted to operate using the scan test circuit architecture(s) and test technique(s) described herein. Moreover, using programmable circuitry means that additional resources (e.g., components) need not be inserted or added to IC 100 to implement the inventive arrangements described herein.

The inventive arrangements described herein provide several advantages over conventional scan test circuit architectures and test techniques. With conventional scan test circuit architectures, pipeline circuitry may be used for the scan data, but not for scan control signals. To time align the scan data across the different instances of the IP core, programmable delay circuits may be included in the different instances of the IP cores. For example, referring to FIG. 1 and presuming a conventional scan test circuit architecture where the scan control signals are not pipelined, a programmable delay circuit disposed in IP core 102-2 would be needed to add sufficient latency to balance the scan data paths between IP core 102-1 and IP cores 102-2 (e.g., to add latency to the scan data delivered to IP core 102-2).

Further, in theory, the same test pattern may be used to scan test each instance of the same IP core. Within conventional scan test circuit architectures, however, the test patterns delivered to each instance of an IP core being tested require modification, e.g., "retargeting," so that the test patterns work with each instance of the IP core. The retargeting accounts for the difference in arrival time between the scan control signals and the scan data at each respective instance of the IP cores being tested by adding additional clock cycles (e.g., "dummy" clock cycles) to each test pattern. Given that each IP core may have tens, hundreds, or thousands of test patterns and that an IC may include many different IP cores and multiple instances of such IP cores, the retargeting adds significant time and cost to scan testing.

One technique for dealing with latency between scan control signal arrival and scan data arrival at the different instances of the IP cores being tested in conventional scan test circuit architectures is to repeatedly suppress the scan clock for multiple clock cycles. This allows the scan enable signal to settle at the instances of the IP cores being tested. Suppression accounts the higher latency of the scan enable signal owing to the high fanout of the scan enable signal. Because the scan enable signal does not arrive at each instance of the IP core at the same time, the tester has traditionally performed the scan clock suppression. Tester sourced scan clock suppression to handle high fanout and high latency scan control signals, however, does not work efficiently with different pipeline lengths. In cases where different numbers of pipeline stages are used to different IP cores (and/or instances thereof), clock suppression performed by the tester impacts all of the IP cores/instances being tested but not at the correct time for some of the IP cores/instances since some will have completed a desired action (e.g., shift) while others have not.

The inventive arrangements described herein remove the need for pipeline equalization between instances of IP cores, remove the need for programmable delays within the instances of the IP cores, and eliminate the need for adding dummy clock cycles to test patterns.

Figure 2:
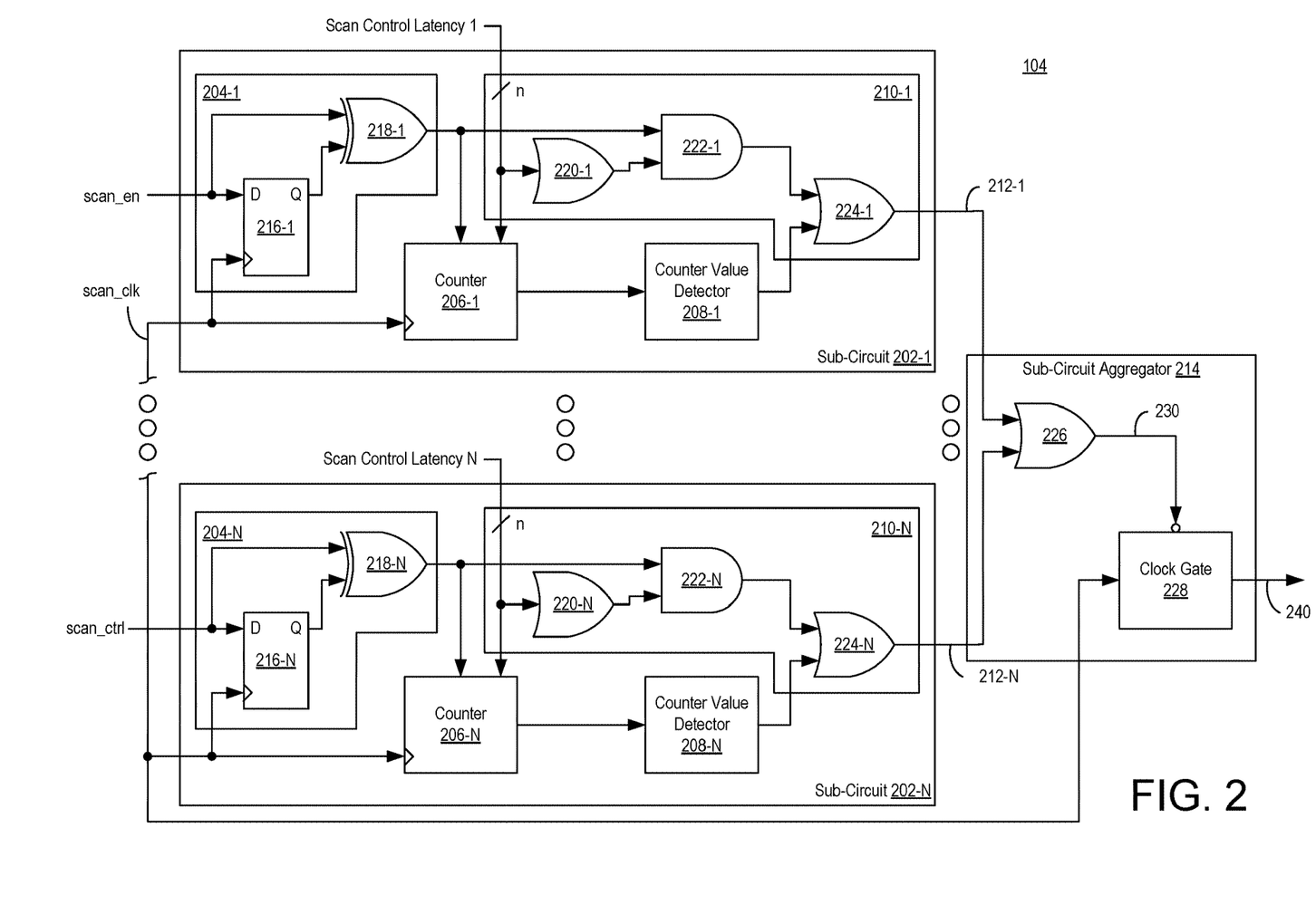
FIG. 2 illustrates an example of a wave shaping circuit of the scan test circuit architecture of FIG. 1.

FIG. 2 illustrates an example of a wave shaping circuit 104. In the example, wave shaping circuit 104 includes one or more sub-circuits 202. Each sub-circuit 202 is capable of operating on a selected scan control signal. In the example, sub-circuit 202-1 operates on the scan enable (scan_en) signal, while the other sub-circuits 202 operate on other scan control signals. Each sub-circuit 202 is capable of generating a scan control suppression signal 212 that is provided to a sub-circuit aggregator 214. Sub-circuit aggregator 214 is configured to selectively gate the scan clock provided to the instance of the IP core associated with the wave shaping circuit 104 responsive to the scan control suppression signals 212 received from each of the sub-circuits 202.

Each sub-circuit 202 includes a trigger event detector 204, a counter 206, a counter value detector 208, and an output circuit 210. Trigger event detector 204 can include a flip-flop (FF) 216 and an exclusive OR gate 218. For purposes of illustration, reference is made to sub-circuit 202-1 processing the scan enable signal. That is, sub-circuit 202-1 is configured to detect trigger events on the scan enable signal. Responsive to detecting trigger events on the scan enable signal, sub-circuit 202-1 generates scan control suppression signal 212-1 initiating suppression of the scan clock. Appreciably, each sub-circuit 202 is capable of monitoring for the occurrence of trigger events on a different scan control signal.

As shown, FF 216-1 receives the scan enable signal (e.g., the particular scan control signal to be monitored) and is clocked by the scan clock. The output of FF 216-1 is provided to an input of exclusive OR gate 218-1. The scan enable signal is provided directly to another input of exclusive OR gate 218-1. The exclusive OR gate 218-1 generates an output that is provided to counter 206-1 (e.g., as a write enable signal) and to output circuit 210-1. In general, trigger event detector 204-1 generates a high signal in response to each detection of a transition (e.g., high-to-low or low-to-high) of the scan enable signal.

Each detection of a transition in the monitored scan control signal results in a high signal from exclusive OR gate 218-1 to counter 206-1 thereby allowing the value specified by the scan control latency 1 signal to be loaded into counter 206-1. Loading a value into counter 206-1 also causes counter 206-1 to begin counting down from the loaded value. Thus, counter 206-1 is dynamically programmable to count down from a particular value shown in FIG. 2 as "scan control latency 1." Each counter 206 of a sub-circuit 202 may be programmed independently and, as such, may or may not be programmed with a same value. In one aspect, scan enable latency 1 may be loaded into counter 206-1 on a per test pattern basis. That is, the same or a different value may be loaded into counter 206-1 responsive to each detection of a transition of the monitored scan control signal by trigger event detector 204-1. In general, the value loaded into counter 206-1 determines the number of clock cycles that the scan clock is to be suppressed given the detected trigger event detected on the monitored scan control signal. In the example of sub-circuit 202-1, sub-circuit 202-1 will suppress the scan clock for a number of clock cycles in response to detecting a transition (e.g., a trigger event) on the scan enable signal.

In the example, while the counter 206-1 is loaded with a counter value in response to a detected transition on the scan enable signal, the counter does not influence the behavior of the circuit until the next clock cycle (cycle of the scan clock). Thus, sub-circuit 202-1 is operative to suppress the first cycle of the scan clock following a detection of a transition on the scan enable signal regardless of the value loaded into counter 206-1.

Output circuit 210-1 may include an OR gate 220-1, an AND gate 222-1, and another OR gate 224-1. OR gate 220-1 receives the value specified as scan control latency 1 (e.g., a multi-bit signal). In response to determining that scan control latency 1 is non-zero, OR gate 220-1 generates a high signal as output that is provided to an input of AND gate 222-1. The signal generated by exclusive OR gate 218-1 is received at another input of AND gate 222-1. In response to both signals received by AND gate 222-1 going high (e.g., the value specified by scan control latency 1 being non-zero and a transition having been detected on the scan enable signal), AND gate 222-1 generates an output signal that goes high to an input of OR gate 224-1, which passes the signal as scan control suppression signal 212-1 to sub-circuit aggregator 214.

Sub-circuit aggregator includes an OR gate 226 and a clock gate 228. In general, enabling clock gate 228 with a high signal to the control input causes clock gate 228 to allow the scan clock to pass unaffected. Thus, the instance of the IP core is provided with a scan clock that toggles when the scan clock is passed by clock gate 228. Because of the inverted control signal input of clock gate 228, a high suppression signal 230 provided to clock gate 228 causes clock gate 228 to gate or block the scan clock thereby suppressing the scan clock provided to the instance of the IP core. In the example, OR gate 226 receives the scan control suppression signal 212 from each sub-circuit 202. So long as any one of the scan control suppression signals 212 is asserted, or high, clock gate 228 will continue to suppress the scan clock.

In the example, signal 240 is the scan clock provided to the instance of the IP core. Any suppression implemented with respect to the scan clock manifests on signal 240. Signal 240 may also be referred to as the scan clock to IP core (scanclk_to_IPcore) signal.

Turning back to operation of the counter 206-1 and the counter value detector 208-1, counter value detector 208-1 is capable of reading the value stored in counter 206-1. In response to reading a particular value from counter 206-1, counter value detector 208-1 is capable of generating a high output signal. Because sub-circuit 202-1 automatically suppresses the scan clock for one clock cycle, counter value detector 208-1 is configured to detect when counter 206-1 counts down and reaches the value of 1 or 0. Counter value detector 208-1 implements logic that generates a high signal as output to OR gate 224-1 anytime that the value read from counter 206-1 is not 0 or is not 1. Thus, while counter 206-1 counts down and has a counter value of 2 or more, counter value detector 208-1 will generate a high signal thereby causing clock gate 228 to continue suppressing the scan clock. A value of 1 or 0 results in no suppression of the scan clock at least in consequence of operation of counter 206 and counter value detector 208-1.

With the circuit architecture illustrated in FIG. 2, loading a value of 0 as the scan control latency into a sub-circuit 202 will not result in suppression of the scan clock for a single clock cycle since OR gate 220-1 will output a low signal, thereby preventing AND gate 222-1 from outputting a high signal that propagates to sub-circuit aggregator 214. Suppressing the scan clock for more than one clock cycle requires loading a value of 2 or more into the counter 206. In the example, suppression of the scan clock for a desired number of scan clock cycles C requires loading the counter with a value of C−1.

Each sub-circuit 202 may operate substantially as described in connection with sub-circuit 202-1, albeit with reference to monitoring a different scan control signal. In the example of FIG. 2, because the scan control suppression signals 212 are aggregated by OR gate 226, so long as any one of sub-circuits 202 outputs a high scan control suppression signal 212, the scan clock to the instance of the IP core will be suppressed. Thus, the largest scan control latency loaded into any sub-circuit 202, presuming a trigger event is detected on the monitored scan control signals at the same time, will govern scan clock suppression.

In general, the values of the scan enable latencies used for each instance of the IP core will depend on the size of the IP core. Further, the particular scan enable latency loaded into each sub-circuit 202 of a given instance of wave shaping circuit 104 may vary based on the signal routing and loading of the respective scan control signal.

The example wave shaping circuit 104 illustrated in FIG. 2, when used with instances of an IP core for scan testing, is capable of implementing the launch on capture protocol for scan testing while using the pipelining illustrated in FIG. 1. Wave shaping circuit 104 may be used to allow the scan test signals to propagate asynchronously within instances of IP cores for purposes of intest. Further, the example wave shaping circuit 104 may be used to align the capture window during extest of the instances of the IP core(s). Within DFT, intest generally refers to testing the functionality of circuitry within a circuit block (e.g., an instance of an IP core). Extest refers to testing the interface or boundary between neighboring circuit blocks (IP cores and/or instances thereof). As noted, use of the wave shaping circuits 104 illustrated herein for scan test purposes facilitates the use of synchronous scan control signals outside of hardened circuit blocks and asynchronous scan control signals inside hardened circuit blocks. This approach minimizes the amount of hardware overhead that is necessary to implement scan test for the IC.

Figure 3:
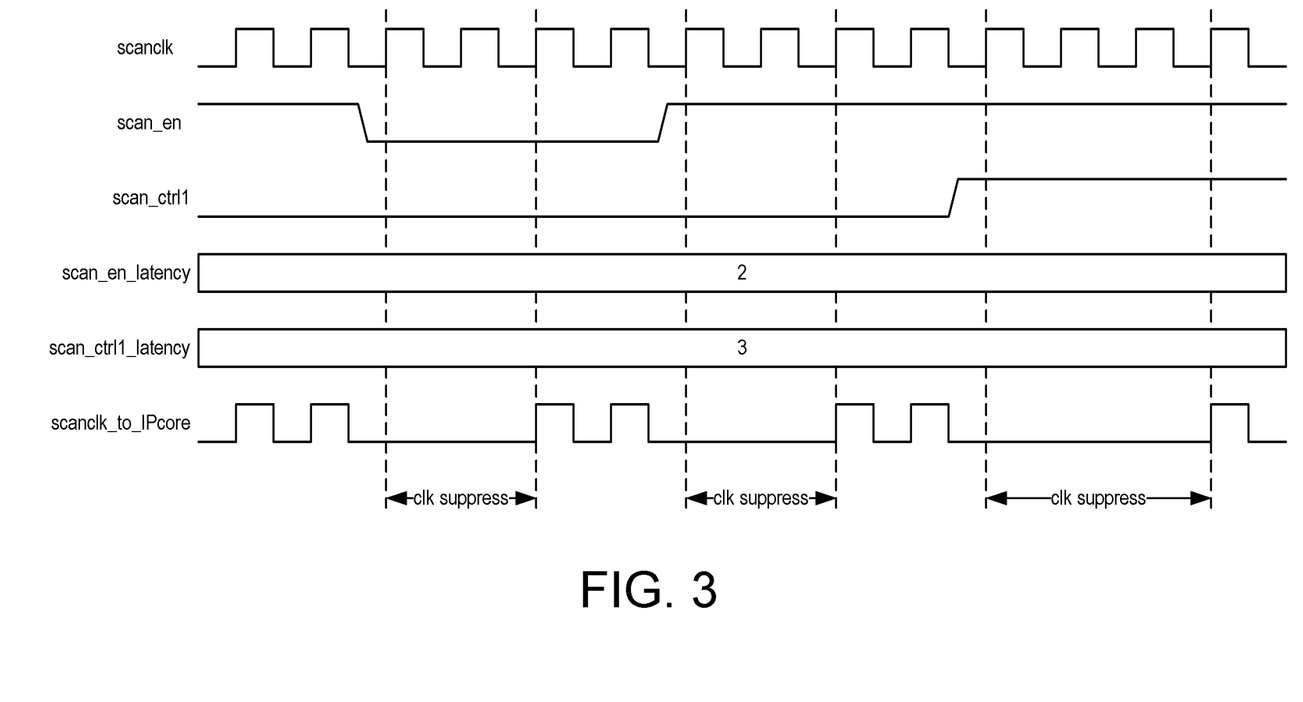
FIG. 3 illustrates example scan control signals with reference to a scan clock for an intellectual property (IP) core.

FIG. 3 illustrates example scan control signals with reference to a scan clock for an IP core. In the example, the scan clock continues to transition. The two scan control signals illustrated and monitored by respective sub-circuits 202 of a wave shaping circuit 104 for an instance of an IP core are the scan enable signal (scan_en) and the scan control 1 (scan_ctrl1) signal. FIG. 3 illustrates that the scan control latency for the scan enable signal (scan_en_latency) is 2 cycles of the scan clock, while the scan control latency for the scan control signal 1 (scan_ctrl1_latency) is 3 cycles of the scan clock. FIG. 3 illustrates that the scan clock provided to the instance of the IP core 102 (shown as scanclk_to_IPcore) is suppressed first for 2 scan clock cycles in response to the scan enable signal transitioning from high-to-low and again for 2 scan clock cycles in response to the scan enable signal transitioning from low-to-high. Subsequently, the scanclk_to_IPcore signal is suppressed for 3 scan clock cycles in response to the transition detected on the scan control 1 signal.

Figure 4:
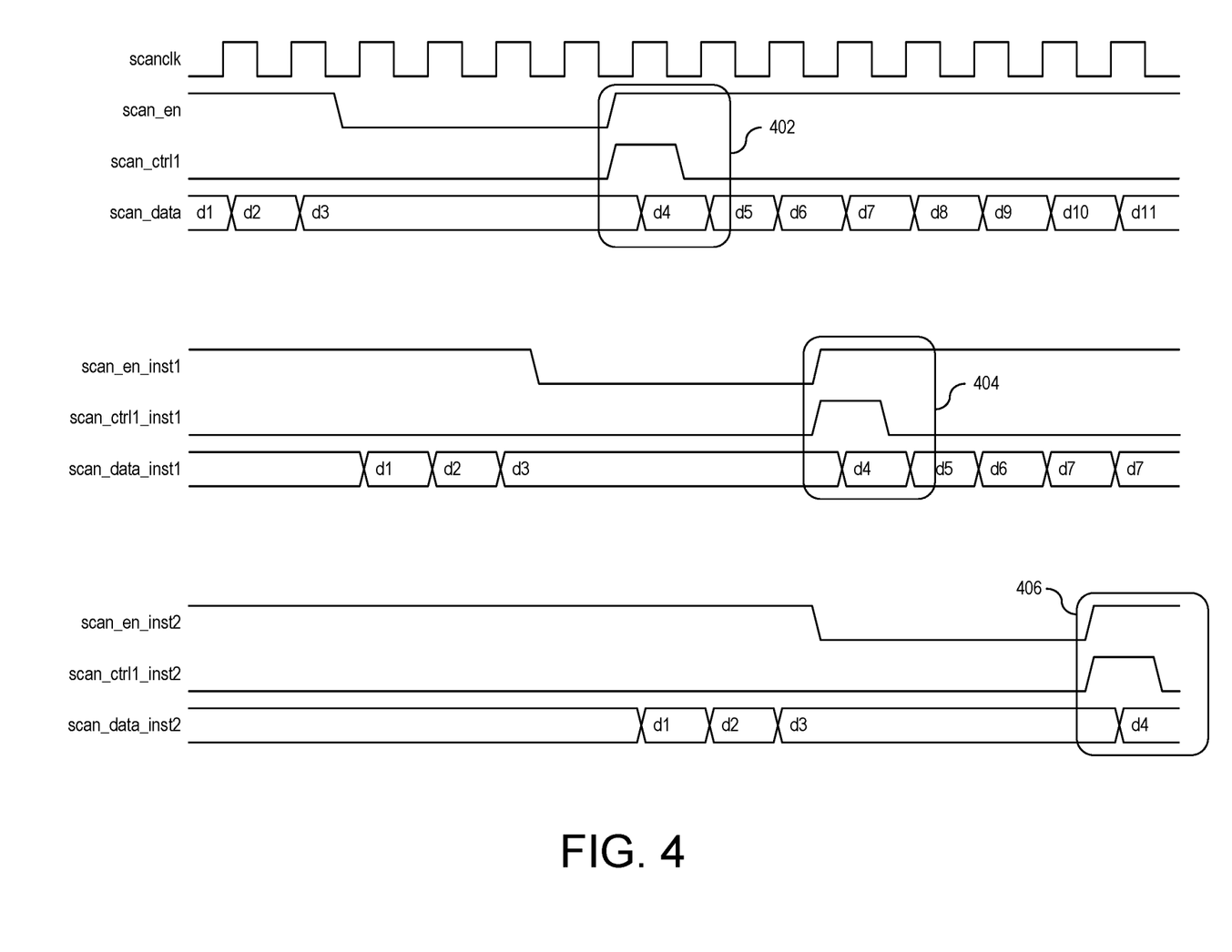
FIG. 4 illustrates another example of scan control signals with reference to a scan clock for multiple instances of an IP core.

FIG. 4 illustrates another example of scan control signals with reference to a scan clock for multiple instances of an IP core. In the example of FIG. 4, a tester is capable of driving the scan enable and other signals shown aligned with the scan data. The example of FIG. 4 illustrates that scan clock suppression is not performed by the tester. As such, the scan clock is free running with respect to the tester. The test patterns generated at the IP core level may be re-used directly on the ATE to test multiple instances of the IP core on the IC without having to retarget the test patterns for each instance of the IP core. The ATE is agnostic to the different instances of a given IP core and the distance of the various instances from the tester accessible pins of the IC. The ATE wave 402, 404, and 406, illustrating the alignment of the transition on the scan enable signal, the scan control 1 signal, and the scan data, is maintained at each of instance 1 and instance 2 of the IP core.

The inventive arrangements described herein provide the ATE with a complete view of the scan test data and scan control signals from the tester accessible pins of the IC to the boundaries of the IP cores and/or instances of the IP cores. The waveform invariance demonstrated in FIG. 4 illustrates that the ATE and the test program does not need distinguish between different instances of the same IP core regardless of the distance of the instances, in terms of signal delay, from the ATE-accessible pins of the IC. From the ATE point of view, all instances of the IP core are tested simultaneously. This results in a significant reduction in complexity of Automatic Test Pattern Generation (ATPG) and test pattern verification as well as a simplified test program. The inventive arrangements further can reduce resource requirements in terms of test time (e.g., work hours) and cost (e.g., licensing costs and time).

The following discussion illustrates an example of performing intest for one or more instances of an IP core using the example scan test circuit architecture described herein. With respect to ATPG, for intest of an IP core, a number of tester cycles may be added pre and post shift phases of the scan protocol file to propagate transitions on slow scan control signals. For example, additional tester cycles may be added pre and post shift phases for scan control signals such as scan enable and capture trigger. The low-to-high and high-to-low transitions must have an equal number of delay cycles. Further, the scan_clk should pulse in every tester cycle including cycles added for control signal propagation. The ATPG may be run at the IP core-level and test patterns may be saved in a tester supported file format.

Regarding test pattern processing for IC (e.g., SoC) level re-play, the output comparisons may be shifted out on output pins of the IC (e.g., to the tester) by output pipeline circuitry (not shown). No change to the stimuli need be applied on the input pins of the IC accessible to the tester. Padding cycles may be added at the end of the file to shift out expected values from the output pipeline circuitry to the tester. The padding cycles should be equal to the length of the output pipeline circuitry.

In applying the test patterns at the IC (e.g., SoC) level, the counters 206 of the sub-circuits 202 of the various wave shaping circuits 104 of the instances of the IP cores being tested may be programmed. Each counter 206 may be programmed with a value that is equal to the control signal propagation cycles applied during IP core-level pattern generation. The processed test patterns may then be applied at the IC level.

The following discussion illustrates an example of performing extest involving one or more instances of an IP core using the example scan test circuit architecture described herein. More particularly, the handling delays on arrival times of scan control signals for extest is described. With respect to ATPG, during extest for multiple IP cores (e.g., and/or instances of IP cores), the number of required tester cycles for pre and post shift phases may be added to the scan protocol file to propagate transitions on slow control signals as previously described. The low-to-high and high-to-low transitions must have an equal number of delay cycles. Pre and post shift cycles must be equal to or greater than the arrival time of the scan control signals to any of the instances of the IP core having a maximum delay on the scan control signals. Further, the scan_clk should pulse in every tester cycle including cycles added for control signal propagation. The ATPG may be run and the test patterns may be saved in a tester supported file format.

Test pattern processing at the IC (e.g., SoC) level for extest may be implemented in the same manner as described for intest.

Regarding test pattern application at the IC (e.g., SoC) level, each counter 206 of the sub-circuits 202 of the wave shaping circuits 104 of the instances of the IP cores 102 to be tested may be programmed with a value that is equal to the control signal propagation cycles applied during IP core-level test pattern generation. For the capture clock source trigger, the count should be equal to the IP core that takes the maximum clock cycles (e.g., most clock cycles) to propagate all scan control signals. The processed test patterns may then be applied to the IC.

Figure 5:
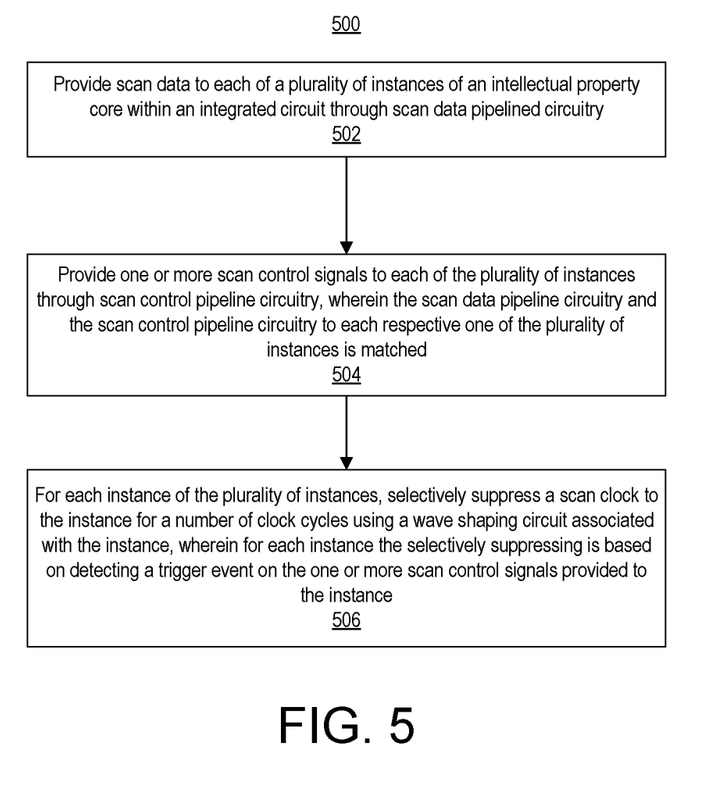
FIG. 5 is an example method of scan-based testing for an IC including the example scan test circuit architecture(s) described herein.

FIG. 5 is an example method 500 of scan-based testing for an IC including the example scan test circuit architecture(s) described herein. Method 500 may be performed, at least in part, using ATE configured to test one or more ICs including IP cores and/or instances of an IP core therein.

In block 502, scan data may be provided to each of a plurality of instances of an IP core implemented within the IC through scan data pipeline circuitry. For example, the scan data may be provided from ATE through tester accessible pins (e.g., input/output or I/O pins) of the IC through the scan data pipeline circuitry. In block 504, one or more scan control signals may be provided to each of the plurality of instances through scan control pipeline circuitry. For example, the scan control signal(s) may be provided from ATE through the I/O pins of the IC through the scan control pipeline circuitry. The scan data pipeline circuitry and the scan control signal pipeline circuitry to each respective one of the plurality of instances may be matched. In block 506, for each instance of the plurality of instances, a scan clock to the instance may be selectively suppressed for a number of clock cycles using a wave shaping circuit associated with the instance. The selectively suppressing for each instance may be based on detecting a trigger event on the one or more scan control signals provided to the instance.

The foregoing and other implementations can each optionally include one or more of the following features, alone or in combination. Some example implementations include all the following features in combination.

In one aspect, the method can include generating test data specifying the scan data and the one or more scan control signals provided to each of the plurality of instances.

In another aspect, the method includes selecting the number of clock cycles to suppress for each of the plurality of instances on a per instance basis.

In another aspect, the one or more scan control signals include a plurality of scan control signals. In that case, the method can include selecting the number of clock cycles to suppress independently on a per scan control signal basis and independently across each of the plurality of instances.

In another aspect, the method can include selecting the number of clock cycles to suppress in response to a detected trigger event on at least one selected scan control signal of the plurality of scan control signals in at least one instance of the plurality of instances on a per test vector basis.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions contained in program code.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

An IC can include a first IP core, first scan data pipeline circuitry configured to convey scan data to the first IP core, and first scan control pipeline circuitry configured to convey one or more scan control signals to the first IP core. The IC also can include a first wave shaping circuit configured to detect a trigger event on the one or more scan control signals and, in response to detecting the trigger event, suppress a scan clock as provided to the first IP core for a selected number of clock cycles.

The foregoing and other implementations can each optionally include one or more of the following features, alone or in combination. Some example implementations include all the following features in combination.

In one aspect, the IC can include a second IP core. The first and second IP cores can be different instances of a same circuit block. The IC can include second scan data pipeline circuitry configured to convey the scan data to the second IP core. The IC can include second scan control pipeline circuitry configured to convey the one or more scan control signals to the second IP core. The IC can include a second wave shaping circuit configured to detect a trigger event on the one or more scan control signals as provided to the second IP core. In response to detecting the trigger event, the second wave shaping circuit is configured to suppress the scan clock as provided to the second IP core for a selected number of clock cycles. In one aspect, the selected number of clock cycles for the second IP core is independent of the selected number of clock cycles for the first IP core.

In another aspect, the selected number of clock cycles is programmable within the wave shaping circuit.

In another aspect, the selected number of clock cycles is dynamically programmable within the wave shaping circuit on a per test vector basis.

In another aspect, the first scan data pipeline circuitry and the first scan control pipeline circuitry are matched.

In another aspect, the IC includes programmable logic and the first scan control pipeline circuitry may be implemented using the programmable logic.

In another aspect, the wave shaping circuit is implemented within the first IP core as hardened circuitry.

In another aspect, the IC includes programmable logic and the wave shaping circuit may be implemented external to the first IP core using the programmable logic.

In another aspect, the one or more scan control signals include a plurality of scan control signals. The wave shaping circuit can include a plurality of wave shaping sub-circuits. Each wave shaping sub-circuit may monitor an associated one of the plurality of scan control signals. Each wave shaping sub-circuit may be independently programmable to suppress the scan clock provided to the first IP core for a number of clock cycles.

An IC can include an intellectual property core and a wave shaping circuit adapted for scan testing the IP core. The wave shaping circuit may include one or more wave shaping sub-circuits. Each wave shaping sub-circuit may be operative to suppress a scan clock as provided to the IP core in response to detecting a trigger event on an associated scan control signal. Each wave shaping sub-circuit may be independently programmable to suppress the scan clock for a selected number of clock cycles specific to the respective wave shaping sub-circuit.

The foregoing and other implementations can each optionally include one or more of the following features, alone or in combination. Some example implementations include all the following features in combination.

In one aspect, the wave shaping circuit is implemented within the IP core as hardened circuitry.

In another aspect, the IC may include programmable logic and the wave shaping circuit may be implemented external to the IP core using the programmable logic.

In another aspect, the wave shaping sub-circuit may include a trigger event detector configured to detect trigger events on the associated scan control signal. The wave shaping sub-circuit may include a counter programmable to count down from a programmed value determined based on the selected number of clock cycles. The wave shaping sub-circuit may include a counter value detector configured to detect selected states of the counter (e.g., selected counter values stored therein). The wave shaping sub-circuit may include an output circuit coupled the trigger event detector and the counter value detector. The output circuit may be configured to generate a scan control suppression signal based on signals from the trigger event detector, the counter value detector, and the programmed value. The scan control suppression signal indicates whether to suppress the scan clock based on the associated scan control signal.

In another aspect, the wave shaping circuit may include a sub-circuit aggregator configured to selectively gate the scan clock responsive to the scan control suppression signal.

In another aspect, the IC may include one or more additional IP cores, wherein the IP core and the one or more additional IP cores are different instances of a same circuit block. The IC may include one or more additional wave shaping circuits corresponding to the one or more additional IP cores. Each of the one or more additional wave shaping circuits may be adapted for scan testing the corresponding one of the one or more IP cores.

In one aspect, each of the one or more additional wave shaping circuits includes one or more wave shaping sub-circuits. Each wave shaping sub-circuit may be operative to suppress the scan clock provided to the corresponding IP core in response to detecting a trigger event on the associated scan control signal. Each wave shaping sub-circuit may be independently programmable to suppress the scan clock for a selected number of clock signals specific to the respective wave shaping sub-circuit.

What is claimed is:
1. An integrated circuit, comprising:
a first intellectual property core;
first scan data pipeline circuitry configured to convey scan data to the first intellectual property core;

first scan control pipeline circuitry configured to convey one or more scan control signals to the first intellectual property core; and
a first wave shaping circuit configured to detect a trigger event on the one or more scan control signals and, in response to detecting the trigger event, suppress a scan clock as provided to the first intellectual property core for a selected number of clock cycles.

2. The integrated circuit of claim 1, comprising:
a second intellectual property core, wherein the first and second intellectual property cores are different instances of a same circuit block;
second scan data pipeline circuitry configured to convey the scan data to the second intellectual property core;
second scan control pipeline circuitry configured to convey the one or more scan control signals to the second intellectual property core; and
a second wave shaping circuit configured to detect a trigger event on the one or more scan control signals as provided to the second intellectual property core and, in response to detecting the trigger event, suppress the scan clock as provided to the second intellectual property core for a selected number of clock cycles;
wherein the selected number of clock cycles for the second intellectual property core is independent of the selected number of clock cycles for the first intellectual property core.

3. The integrated circuit of claim 1, wherein
the selected number of clock cycles is programmable within the wave shaping circuit.

4. The integrated circuit of claim 1, wherein
the selected number of clock cycles is dynamically programmable within the wave shaping circuit on a per test vector basis.

5. The integrated circuit of claim 1, wherein
the first scan data pipeline circuitry and the first scan control pipeline circuitry are matched.

6. The integrated circuit of claim 1, further comprising:
programmable logic;
wherein the first scan control pipeline circuitry is implemented using the programmable logic.

7. The integrated circuit of claim 1, wherein
the wave shaping circuit is implemented within the first intellectual property core as hardened circuitry.

8. The integrated circuit of claim 1, further comprising:
programmable logic;
wherein the wave shaping circuit is implemented external to the first intellectual property core using the programmable logic.

9. The integrated circuit of claim 1, wherein
the one or more scan control signals comprise a plurality of scan control signals;
the wave shaping circuit comprises a plurality of wave shaping sub-circuits;
each wave shaping sub-circuit is operative to monitor an associated one of the plurality of scan control signals; and
each wave shaping sub-circuit is independently programmable to suppress the scan clock provided to the first intellectual property core for a number of clock cycles.

10. An integrated circuit, comprising:
an intellectual property core; and
a wave shaping circuit adapted for scan testing the intellectual property core;
wherein the wave shaping circuit includes:
one or more wave shaping sub-circuits, wherein each wave shaping sub-circuit is operative to suppress a scan clock as provided to the intellectual property core in response to detecting a trigger event on an associated scan control signal; and
each wave shaping sub-circuit is independently programmable to suppress the scan clock for a selected number of clock cycles specific to the respective wave shaping sub-circuit.

11. The integrated circuit of claim 10, wherein
the wave shaping circuit is implemented within the intellectual property core as hardened circuitry.

12. The integrated circuit of claim 10, further comprising:
programmable logic;
wherein the wave shaping circuit is implemented external to the intellectual property core using the programmable logic.

13. The integrated circuit of claim 10, wherein the wave shaping sub-circuit comprises:
a trigger event detector configured to detect trigger events on the associated scan control signal;
a counter programmable to count down from a programmed value determined based on the selected number of clock cycles;
a counter value detector configured to detect selected states of the counter; and
output circuit coupled the trigger event detector and the counter value detector, wherein the output circuit is configured to generate a scan control suppression signal based on signals from the trigger event detector, the counter value detector, and the programmed value; and
wherein the scan control suppression signal indicates whether to suppress the scan clock based on the associated scan control signal.

14. The integrated circuit of claim 13, wherein the wave shaping circuit comprises:
a sub-circuit aggregator configured to selectively gate the scan clock responsive to the scan control suppression signal.

15. The integrated circuit of claim 14, further comprising:
one or more additional intellectual property cores, wherein the intellectual property core and the one or more additional intellectual property cores are different instances of a same circuit block; and
one or more additional wave shaping circuits corresponding to the one or more additional intellectual property cores, wherein each of the one or more additional wave shaping circuits is adapted for scan testing the corresponding one of the one or more intellectual property cores;
wherein each of the one or more additional wave shaping circuits includes:
one or more wave shaping sub-circuits, wherein each wave shaping sub-circuit is operative to suppress the scan clock provided to the corresponding intellectual property core in response to detecting a trigger event on the associated scan control signal; and
each wave shaping sub-circuit is independently programmable to suppress the scan clock for a selected number of clock signals specific to the respective wave shaping sub-circuit.

16. A method, comprising:
providing scan data to each of a plurality of instances of an intellectual property core within an integrated circuit through scan data pipeline circuitry;
providing one or more scan control signals to each of the plurality of instances through scan control signal pipeline circuitry;

wherein the scan data pipeline circuitry and the scan control signal pipeline circuitry to each respective one of the plurality of instances are matched; and for each instance of the plurality of instances, selectively suppressing a scan clock to the instance for a number of clock cycles using a wave shaping circuit associated with the instance, wherein for each instance the selectively suppressing is based on detecting a trigger event on the one or more scan control signals provided to the instance.

17. The method of claim 16, further comprising:
generating test data specifying the scan data and the one or more scan control signals provided to each of the plurality of instances.

18. The method of claim 16, further comprising:
selecting the number of scan clock cycles to suppress for each of the plurality of instances on a per instance basis.

19. The method of claim 16, wherein the one or more scan control signals include a plurality of scan control signals, wherein the method further comprises:
selecting the number of scan clock cycles to suppress independently on a per scan control signal basis and independently across each of the plurality of instances.

20. The method of claim 19, further comprising:
selecting the number of scan clock cycles to suppress in response to a detected trigger event on at least one selected scan control signal of the plurality of scan control signals in at least one instance of the plurality of instances on a per test vector basis.

* * * * *